UNITED STATES PATENT OFFICE.

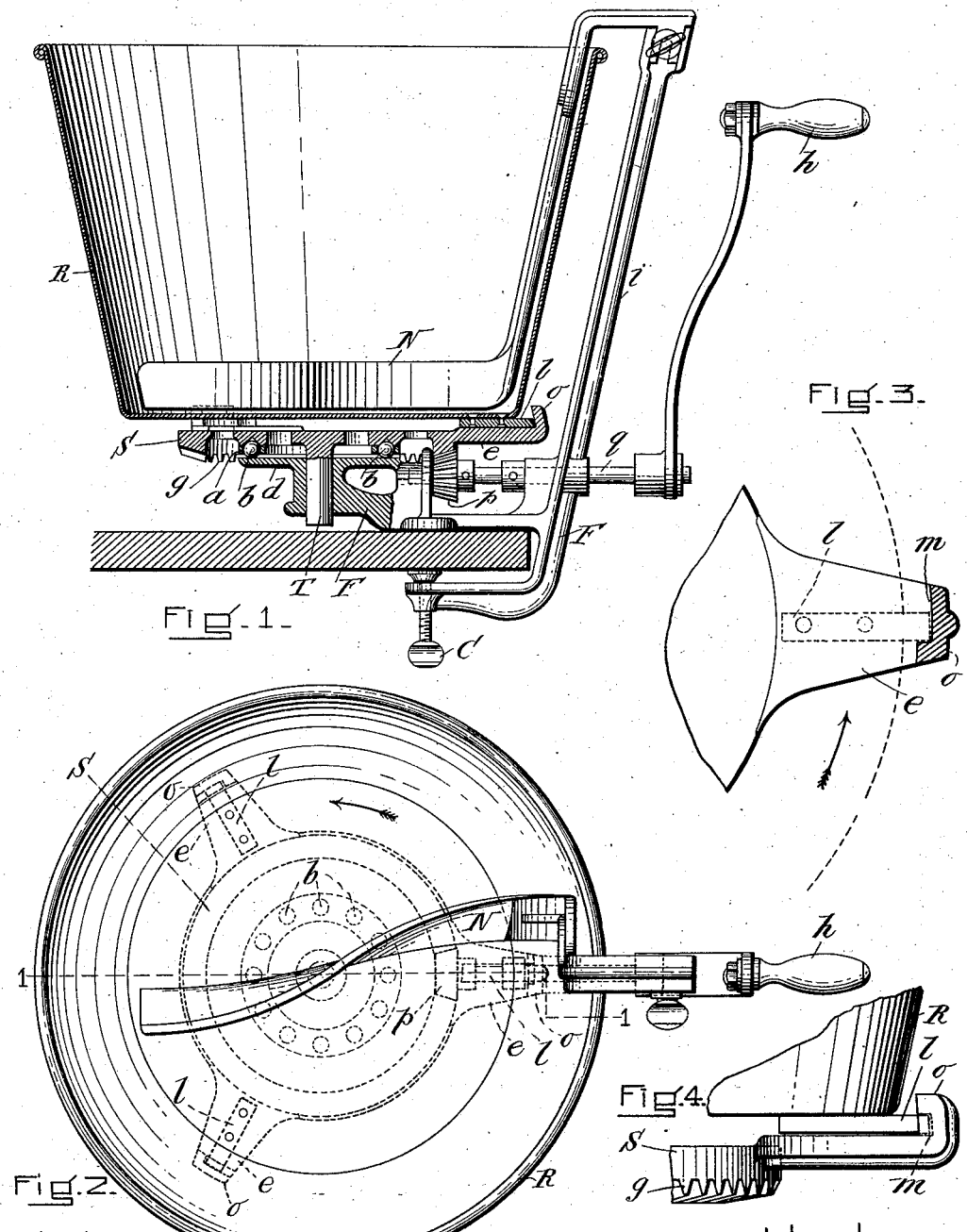

SAMUEL A. BIGELOW, OF BOSTON, MASSACHUSETTS, ASSIGNOR TO SUMNER MANUFACTURING COMPANY, OF BOSTON, MASSACHUSETTS, A CORPORATION OF MASSACHUSETTS.

MACHINE FOR MIXING LIQUID AND POWDERED MATERIALS.

1,027,172.  Specification of Letters Patent.  Patented May 21, 1912.

Application filed August 29, 1911. Serial No. 646,753.

*To all whom it may concern:*

Be it known that I, SAMUEL A. BIGELOW, a citizen of the United States of America, residing at Boston, in the county of Suffolk and Commonwealth of Massachusetts, have invented certain Improvements in Machines for Mixing Liquid and Powdered Materials, of which the following is a specification.

The invention relates to that class of mixing machines which are largely used for mixing or kneading dough, and consists in improved means by which the receptacle in which the mixing takes place, is engaged and released by rotating the receptacle support in one or the other direction.

Heretofore various devices have been employed for securing the mixing receptacle to its rotatable support, but so far as I am aware it has always been necessary to manipulate such devices by hand, to unlock or unlatch them, after the machine has been stopped, in order to release and disengage the receptacle.

My improvements consist in projecting parts or lugs secured to the outside of the receptacle, or to its support, preferably to the former, and in that case, correspondingly spaced ears or projections secured to the support, which ears are provided with slots or sockets adapted to receive and engage the lugs on the receptacle when it is placed upon the support and one is rotated in relation to the other. The preferable construction is, to arrange the lug sockets on the support, so that when it is turned in a direction to operate the mixer the lugs on the receptacle will enter the slots and automatically engage them, thus securing the receptacle to its support without hand manipulation of any locking devices, which engagement will continue while the machine is turned in the operative direction and when the machine is reversed, the receptacle and its support may be automatically disengaged by a small amount of resistance upon the receptacle, such as that caused by the material therein resisting the action of the mixing blade, thus causing a movement of the support in the opposite direction, in relation to the receptacle, and thereby withdrawing the lugs from the slots; also in order to produce a very easily running machine, especially when operated by hand, I provide antifriction devices such as ball bearings, between the said support and its sustaining frame.

In the drawings, I have illustrated my improvements as applied to a machine commonly known as a dough or bread mixer, wherein, Figure 1, is an elevation of the machine with the receptacle and one of its attached lugs and the rotatable support and one of its lug-engaging ears, in section on line 1—1, Fig. 2; Fig. 2, is a plan, viewed from above, the support, its lug-engaging ears and the ball-bearings being indicated in dotted lines; Fig. 3, is a detail plan of one of the ears on the support, with the lug-engaging slot in section, and Fig. 4, is a detail of the same parts in elevation.

Referring to the drawings and indicating the several parts of the machine by letters; R is the receptacle for the material to be mixed, S, the rotatable support upon which the receptacle rests and to which it is secured by the engagement and interlocking of the lugs $l$, on the receptacle R, with the slots $m$, in the upwardly projecting portions $o$, on the ears $e$, of the supports S.

F, is the frame of the machine, which may be secured to a table or other article by a clamp screw C.

Upon the under side of the support S, a circular beveled gear $g$, is formed, with which the beveled pinion $p$ meshes. This pinion is keyed to the crank shaft $q$, which has a crank handle $h$ upon its outer end. In the under surface of the support S, is an annular groove $a$, which contains the balls $b$, having a bearing upon the upper surface of a disk $d$ of the frame F. The support S is centered by and turns on a spindle T, held in a socket in the frame. An arm $i$ extends from the frame upward a little above the top of the receptacle R, and has adjustably attached thereto a mixing blade N, which is normally held in a position near the bottom of the interior of the receptacle.

As illustrated, the lugs $l$, are secured to the bottom of the receptacle and project radially therefrom, and the slots $m$, extend in a horizontal plane into the upwardly projecting portions $o$, of the ears $e$; but it is evident that the lugs might project in any other direction and the slots in the ears be located to correspond thereto, or the ears may be attached to the receptacle and the lugs project from the support S, and all serve the same purpose and operate in the same manner. I have illustrated three projecting ears on the support S, as being most convenient and amply sufficient to sustain and hold the receptacle in proper position.

In the machine illustrated the operative direction for turning it is indicated by the arrows in Figs. 2 and 3, so that as it turns the slots in the ears $e$, move over the lugs $l$ and tend constantly to hold the lugs therein and cause the receptacle to turn with the support, thus forcing the material, within the receptacle, against the stationary mixing blade N. When the support S, is turned in a direction opposite to that indicated by the arrow, the lugs will move out of the slots $m$, in the ears $e$, as soon as the resistance of the material against the blade within the receptacle becomes sufficiently great to overcome the friction between the parts.

I claim:—

1. In a machine for kneading or mixing liquid and powdered material, such as flour, a mixing receptacle having a plurality of exteriorly projecting lugs, a support for the receptacle provided with projecting ears having horizontally open slots which receive and engage the lugs on the receptacle when the support is given a rotary movement in relation to the receptacle, in a direction to effect the mixing and which release the lugs when the rotary movement is in the other direction, means to rotate said support, and a mixing blade supported independently of the receptacle and within it, near the bottom.

2. In a machine of the class described, means for securing the mixing receptacle on its rotatable support and releasing it therefrom, consisting of a plurality of lugs upon the receptacle and ears upon the support having horizontally open slots to receive, the lugs, said lugs and ears being respectively coördinately located on said receptacle and support, and means to rotate the support, by which the said slots will engage the lugs when the support is rotated, in relation to the receptacle, in a direction to effect the mixing, and will disengage the lugs when the support is rotated in the other direction.

SAMUEL A. BIGELOW.

Witnesses:
  FLORENCE A. COLLINS,
  JOSEPHINE H. RYAN.

Copies of this patent may be obtained for five cents each, by addressing the "Commissioner of Patents, Washington, D. C."